3,332,801
ELECTRODES FOR BATTERIES
Joseph J. Holechek, Reistertown, and Henry W. Mattheu, Baltimore, Md., assignors to Catalyst Research Corporation, Baltimore, Md., a corporation of Maryland
No Drawing. Filed Nov. 12, 1963, Ser. No. 323,079
6 Claims. (Cl. 136—21)

This invention relates to improvements in electrodes for batteries, and more particularly to improvements in the methods of making positive electrodes in which the active ingredient is silver oxide.

The conventional method of making a positive plate for certain batteries involves applying a silver oxide paste to a support or grid. The resulting structure is then reduced to silver, and the plate is sintered to bond the silver particles, pressed to densify the silver, and treated to convert the silver to active monovalent silver oxide ($Ag_2O$) or divalent silver oxide (AgO). The inherently uneconomical procedure of converting silver oxide to silver and subsequent reconversion of the silver to silver oxide has been believed necessary to provide adequate mechanical strength of the plate. However, in the plurality of steps it is difficult to control the amount of silver oxide and, particularly, consistent electrical efficiency in the finished electrode.

It is therefore among the objects of this invention to provide a method of preparing silver oxide electrodes that is rapid, direct and more economical than presently known, and to provide an electrode with improved mechanical strength and that is more efficient at high rates of discharge.

In accordance with our discovery, these and other objects are obtained by embedding a metal grid in a mass of a finely divided silver oxide, or a mixture of a finely divided silver oxide and silver, and compressing the powder to form a porous, coherent, compact plate that is adherent to the embedded grid. In this general manner, we have been able to produce electrodes with superior mechanical strength, with precisely controlled dimensions and weight, and with improved performance at high discharge rates.

The grid may be a screen, wire, perforated sheet, or expanded metal, formed of any conductive metal to support the active material and to conduct the electric current therefrom. By way of example, grids ranging from 5 to 60 mesh of wire or #1 to #6/0 size expanded metal are very suitable. It is preferred to use a malleable metal grid, for example, silver, silver-coated copper or copper. Grids of resilient metal, such as nickel, occasionally may be slightly deformed during the compression step and the tendency of such a grid to return to its original shape may create surface checks or otherwise mechanically weak areas in the plate. Although this difficulty does not occur in smaller electrodes, up to areas of about 3 square inches, such imperfect electrodes occur more frequently as the electrode size is increased when using resilient grids. Deformation of a malleable metal grid, when and if any does occur, does not adversely affect the mechanical or electrical properties of the plate. Preferably, the grid is of silver or a silver-coated malleable base metal.

The grid is positioned or embedded in a dry, free flowing, finely divided electrode material and the whole is compressed at a pressure sufficient to compact the finely divided electrode material to a porous coherent plate that adheres to grid. It will be recognized that the compression pressure may vary over a wide range depending on the particular finely divided electrode material used and the desired porosity and density of the plate. A compression pressure of between about 3 to 25 tons per square inch is generally needed to provide a plate with good physical and electrical properties. Although compression pressures above 25 tons per square inch can be used, e.g., 40 tons per square inch, the use of such high pressure modifies the porosity and density of the plate to an extent that the desirable electrical properties of the plate are noticeably diminished. The compression is preferably performed at ambient temperature. The actual quantity of finely divided electrode material carried by any grid is largely dependent on the grid mesh size, because a larger grid can accommodate more material per unit of surface than could a smaller grid. Suitably, grids ranging from 5 to 60 mesh of wire, or #1 to #6/0 expanded metal may carry from about 0.2 to 3 grams of finely divided electrode material per square inch of grid.

The finely divided electrode material may be monovalent silver oxide, divalent silver oxide, or mixtures thereof, or a uniform mixture of such silver oxides and finely divided silver, preferably being sufficiently finely divided to pass a 325-mesh Tyler Series sieve. Such powdered silver oxides and powdered silver are readily commercially available. Electrodes of this invention containing no finely divided silver have mechanical strength substantially the same as prior pasted electrodes, while the addition of finely divided silver provides further improvement of mechanical strength. Electrodes made from finely divided material containing 15 to 25% silver, the remainder being finely divided silver oxides, have substantially optimum obtainable mechanical strength and give superior performance in batteries subject to severe conditions of vibration or acceleration.

The proportions of silver oxide and silver may be varied to meet the electrode performance requiremnets for different services. For example, the electrical capacity of the electrode is dependent on the amount and type of silver oxide contained, or, in the case of electrodes of the same weight, the proportion of silver oxide in a mixture with silver. Substantially theoretical electrode voltage is obtained almost instantaneously even when initially discharging at high current densities, e.g., ½ to 1 amp/sq. in., with electrodes containing about 15 to 25% finely divided silver or more; also substantially complete utilization of the silver oxide is obtained even with such high discharge rates. The use of more than about 25% finely divided silver is of no benefit since it reduces electrode capacity and does not substantially further improve mechanical strength. When as much as 50% silver is used the electrode initial voltage almost immediately begins to gradually decrease with continued high rate discharge. The improved high discharge rate performance is attained only after partial discharge with electrodes containing less than about 15% silver, i.e., when silver has been electrolytically formed in the electrode by discharge; such electrodes that contain little or no silver, however, are quite satisfactory for applications not demanding initial high discharge rate performance.

The following examples are further illustrative of this invention and it should be understood that the details thereof are not given by way of limitation.

*Example 1.*—Five grams of thoroughly mixed divalent silver oxide and silver that passed a 325 mesh sieve, in the proportion of 75% silver oxide and 25% silver, were evenly distributed over the bottom of a conventional 2 x 2½ in. rectangular die cavity. A grid, just slightly smaller than the die cavity, of #4/0 mesh expanded silver metal was placed in the die on top of the powdered mixture, and an additional 5 grams of the powdered mixture was evenly distributed in the cavity over the grid. A pressure of 20 tons per square inch was applied to a plunger matching the die cavity to compress the mixture. The resultant plate electrode was a porous coherent plate of compacted powder adherent to and supported by the embedded grid, having smooth surfaces, free of checks, and being highly resistant to cracking, flaking or powdering.

*Example II.*—A #4/0 expanded silver metal grid was placed in the bottom of the die cavity described in Example 1. Ten grams of minus 325 mesh divalent silver oxide, in the proportion of 75% silver oxide and 25% silver, were evenly distributed in the die cavity over the grid, and a second identical grid was then placed on top of the layer of the powder. The plate formed by compressing the powder under a pressure of 20 tons per square inch was porous, coherent, and adherent to the two firmly embedded grids.

The electrodes of this invention may be used in cells or batteries in the same manner as prior silver oxide electrodes, suitably with zinc negative electrodes.

In accordance with the provisions of the patent statutes, we have explained the principle of our invention and have described what we now consider its best embodiments. However, we desire to have it understood that, within the scope of the appended claims, the invention may be practiced otherwise than as specifically described.

We claim:

1. A process for the preparation of a silver oxide electrode comprising the steps of imbedding at least one metal grid in a dry finely divided material consisting essentially of a mixture of silver oxide and silver containing between about 15 and 25% silver, and compressing said material under a pressure of from 3 to 25 tons per square inch to form a porous, coherent compact adherent to the grid.

2. An electrode comprising at least one metal grid embedded in a porous, coherent compact consisting essentially of a uniform mixture of finely divided silver oxide and silver containing between about 15 and 25% silver compressed under a pressure of from 3 to 25 tons per square inch, said compact being self-adherent to said grid.

3. An electrode comprising at least one silver grid embedded in a porous, coherent compact consisting essentially of a uniform mixture of finely divided divalent silver oxide and silver containing between about 15 and 25% silver compressed under a pressure of from 3 to 25 tons per square inch, said compact being self-adherent to said grid.

4. A process according to claim 1 in which the silver oxide is divalent silver oxide.

5. A process according to claim 1 in which the grid is formed of malleable metal.

6. A process according to claim 1 in which the grid is silver.

References Cited

UNITED STATES PATENTS

| | | | |
|---|---|---|---|
| 2,681,945 | 6/1954 | Friedman | 136—20.3 X |
| 3,123,504 | 3/1964 | Schilke | 136—120 X |
| 3,185,591 | 5/1965 | Bartfai et al. | 136—6 X |
| 3,201,279 | 8/1965 | Root | 136—6 X |
| 3,216,911 | 11/1965 | Kronenberg | 204—1.1 |

WINSTON A. DOUGLAS, *Primary Examiner.*

N. P. BULLOCH, *Assistant Examiner.*